Aug. 25, 1953                 K. G. CATLIN                 2,650,308
METHOD OF AND APPARATUS FOR ASCERTAINING TRUE SIZE
OF PHOTOFLUOROGRAPHICALLY RECORDED OBJECTS
IRRESPECTIVE OF ENLARGEMENT OR REDUCTION
Filed May 11, 1950
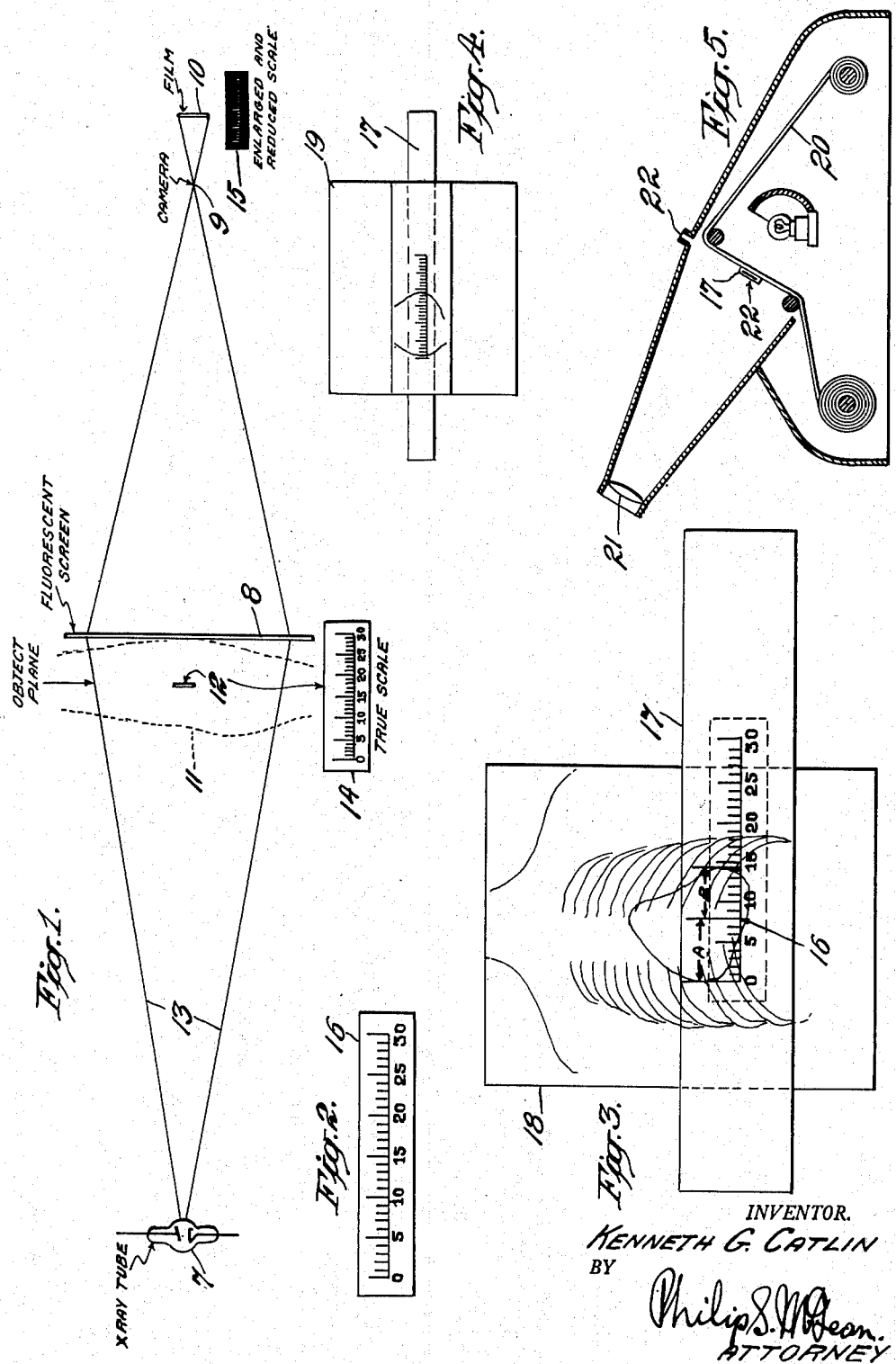
INVENTOR.
KENNETH G. CATLIN
BY
ATTORNEY Patented Aug. 25, 1953

2,650,308

UNITED STATES PATENT OFFICE 2,650,308

METHOD OF AND APPARATUS FOR ASCERTAINING TRUE SIZE OF PHOTOFLUOROGRAPHICALLY RECORDED OBJECTS IRRESPECTIVE OF ENLARGEMENT OR REDUCTION

Kenneth G. Catlin, Basking Ridge, N. J.

Application May 11, 1950, Serial No. 161,314

5 Claims. (Cl. 250—59)

1

The invention disclosed in this patent application relates to the measurement of organs in chest X-ray operations, particularly the heart and with it, for comparison, the chest cage itself and other such items as foreign bodies and abnormal growths.

Special objects of the invention are to make it possible to quickly and accurately ascertain the true size of organs or objects recorded photofluorographically regardless of various stages of enlargement or reduction through which these radiographs may have passed before they have reached the viewing stage.

Under present methods of photofluorography, an object may be successively enlarged and reduced a number of times, so that when the graph reaches the viewing stage there is no true standard by which it can be accurately scaled.

The present invention affords a means by which the observer may directly accurately measure an object such as the heart, regardless of any number of times the radiograph may have been enlarged or reduced.

Basically the invention involves the photographic recording of a measuring scale or other standard of measurement in the same field which will be occupied by the heart or other photofluorographically recorded object, and which standard will thereby become a reference directly readable with that radiograph, irrespective of size changes through enlargement or reduction.

The scale or standard thus established is equally usable with all other photofluorographs made under those same circumstances.

The drawings accompanying and forming a part of this specification illustrate certain ways and means for carrying out the invention, but it will be appreciated that steps and apparatus may be modified and changed within the true intent and broad scope of the invention as hereinafter defined and claimed.

Fig. 1 in the drawings is a diagrammatic view of X-ray projection and photographic reduction on film, showing in the object plane a scale of true measurement and in the film plane of the camera, that same scale as photofluorographically reduced in the same way and to the same extent that a chest object in the same plane in front of the fluorescent screen will be reproduced and reduced on a film in the same camera;

Fig. 2 is an elevation showing the reduced scale, finished, ready for direct use with the radiograph film;

Fig. 3 is a diagrammatic view showing the scale applied to a chest X-ray photofluorographic film;

Fig. 4 is a diagrammatic view showing the scale used in connection with a magnifying viewing apparatus;

Fig. 5 is a part sectional and diagrammatic

2 view showing how the scale is used over a film being inspected in a viewing apparatus.

Fig. 1 shows how the beam from an X-ray tube at 7 may be projected onto a fluorescent screen at 8 and reduced by camera 9 into a photographic record on film 10.

For cardiac or thoracic examinations the exposure is made with the chest of the patient against the fluorescent screen, substantially as indicated by the broken lines 11.

This, by way of example, will locate the largest diameter of the heart about three and one-half inches back of the screen on the object plane designated 12.

The object, whether it be the heart as in the example supposed, or some other organ or element, will first be shown enlarged by projection of the divergent light beam 13 onto the fluorescent screen and then be reduced by the camera onto the small size record film at 10.

The extent of such successive enlargement and reduction depends on several factors, such as the distance of the object from the screen, the distance of the X-ray tube from the object and the ratio of reduction effected by the camera.

For chest X-ray the distance of three and one-half inches from the fluorescent screen may be accepted as practical for the object plane and a distance of the X-ray tube from the screen of something less than six feet may be taken as practical for heart films.

To provide a standard of measurement which can be directly used with these radiographs, a measuring scale of selected form is exposed in the object plane and reduced on the record film under exactly the same conditions as the object in examination. Thus, though separate from the photofluorographic record, it is actually directly proportional to that record and so may be used to directly measure the organs or other elements appearing on the record.

As a practical matter a true size 30 centimeter scale may be used such as indicated at 14.

This projection scale may be on a sheet of material transparent to X-rays, such as Bakelite or cardboard, with the lines and figures of the scale in lead or other radio opaque material.

This specially prepared scale is suspended on the object plane 12, in place of the usual three-dimensional object, with its plane parallel to the recording plane and in the plane between the X-ray tube and the recording plane in which it is desired to obtain accurate measurements.

A regular X-ray exposure is then made, producing a record film like that indicated at 15, in black with transparent lines and figures and on the same reduced scale as would be produced by exposure of the object under examination in plane 12.

The X-ray film scale 15 is reversed by contact printing to retain the same size and to provide a clear field with black lines and figures.

This reversed film, shown at 16 in Fig. 2, is incorporated in a transparent holder as by being secured between two layers of transparent material, as indicated at 17 in Fig. 3, providing stability for use in handling.

This finished scale then has experienced the same changes as any other object passed through the same procedure of enlargement and reduction and therefore will serve as a means for comparing and taking true measurements off of the record film, whether directly viewed or magnified along with the record film.

Fig. 3 illustrates the finished proportioned scale 16 applied in its holder over a chest X-ray photofluorographic film 18. In this example the combined length of A and B may be considered as constituting the information desired. It will be seen that this can be directly read on the transparent scale in a single step. The original and true A, B dimensions of the object, for example the heart, can thus be interpreted in terms of true standard units of measurements regardless of the actual size on the film or the dimensional changes during X-ray projection, optical recording, magnification viewing and the like.

Fig. 4 shows diagrammatically how the scale may be used in a magnifying viewer designated 19.

Details of the latter may be clearer from Fig. 5, illustrating a typical form of magnifying viewer in which the photofluorographic record film 20 is viewed through a magnifying lens 21 and the viewer is provided with a positioning slot or slots 22 to admit the transparent measuring scale in substantially the plane of the film.

In this case the scale, in substantially the same plane with the film, will be magnified to the same extent as the film and consequently will show accurate measurement of objects regardless of this change in size.

The invention, it will be seen, provides a simple and accurate way of measuring the true size of objects which have been recorded photofluorographically or with magnification, eliminating errors of projection, enlargement or magnification.

The transparent measuring scale, being separate and apart from the record film, may be shifted around to take measurements in any direction on the film and without obscuring parts related to such measurements. While this independence and flexibility is generally desired, it is contemplated that this measuring scale directly proportioned to the record film, may be etched on the background glass of the viewing apparatus.

What is claimed is:

1. The herein disclosed method of obtaining accurate measurement of photofluorographically recorded objects, comprising photofluorographically recording on one film an object in a definite object plane on a reduced scale, photofluorographically recording on a different film a standard measuring scale in the same object plane and in the same proportional reduction and thereafter determining measurements of the photographed object by applying said companion photofluorographically reduced measuring scale produced on the second film to said photofluorographically reduced object recording film.

2. The herein disclosed method of obtaining accurate measurement of photofluorographically recorded objects, comprising photofluorographically recording on one film an object in a definite object plane on a reduced scale, photofluorographically recording on a different film a standard measuring scale in the same object plane and in the same proportional reduction and thereafter determining measurements of the photographed object by applying said companion photofluorographically reduced measuring scale produced on the second film to said photofluorographically reduced object recording film and simultaneously equally magnifying both said object recording film and scale film in overlying relation for viewing and measuring purposes.

3. The herein disclosed method of obtaining accurate measurement of photofluorographically recorded objects, comprising photofluorographically recording and reducing both the object and a measuring scale for the same separately on different films from the same object plane, deriving a transparent measuring scale ruler from the film record of the same and thereafter applying said transparent measuring ruler to the object recording film for directly reading off the measurement of objects on said record film and appearing said transparent measuring scale.

4. The herein disclosed method of obtaining a scale ruler for measurement purposes on a photofluorographically produced record, comprising photofluorographically recording a true measurement scale transparent to X-rays and having scale markings opaque to X-rays, in the same plane in which the object of the photofluorographic record is taken whereby to first produce a non-transparent scale with transparent markings directly proportioned to the record object and then printing from said non-transparent scale a corresponding transparent scale with opaque markings which can be used as a ruler over the photofluorographic record without obscuring portions of the recorded object.

5. The herein disclosed method of directly reading off the measurements of photofluorographically recorded objects, which comprises photofluorographically recording an object in a certain object plane, photofluorographically recording a standard measuring scale in the same object plane and on the same scale as the recording of the object and contact printing a measuring rule from the photofluorographic record of the standard measuring scale on a separate, transparent, ruler forming record and thereby providing a transparent ruler which can be laid over the photofluorographic record of the object with the scale thereon directly proportioned to the photofluorographic record of the object and showing by direct reading of the scale the true physical dimensions of the object regardless of enlargements or reductions in size effected in carrying out the steps described.

KENNETH G. CATLIN.

References Cited in the file of this patent

UNITED STATES PATENTS

| Number | Name | Date |
| --- | --- | --- |
| 1,396,920 | Brostrom | Nov. 15, 1921 |
| 1,904,234 | Hoskin et al. | Apr. 18, 1933 |
| 1,937,433 | Moe | Nov. 28, 1933 |
| 2,293,324 | Vladeff | Aug. 18, 1942 |
| 2,344,823 | Landis et al. | Mar. 21, 1944 |
| 2,523,050 | Nighswander | Sept. 19, 1950 |
| 2,563,451 | Booth | Aug. 7, 1951 |

FOREIGN PATENTS

| Number | Country | Date |
| --- | --- | --- |
| 353,426 | Great Britain | July 20, 1931 |